UNITED STATES PATENT OFFICE.

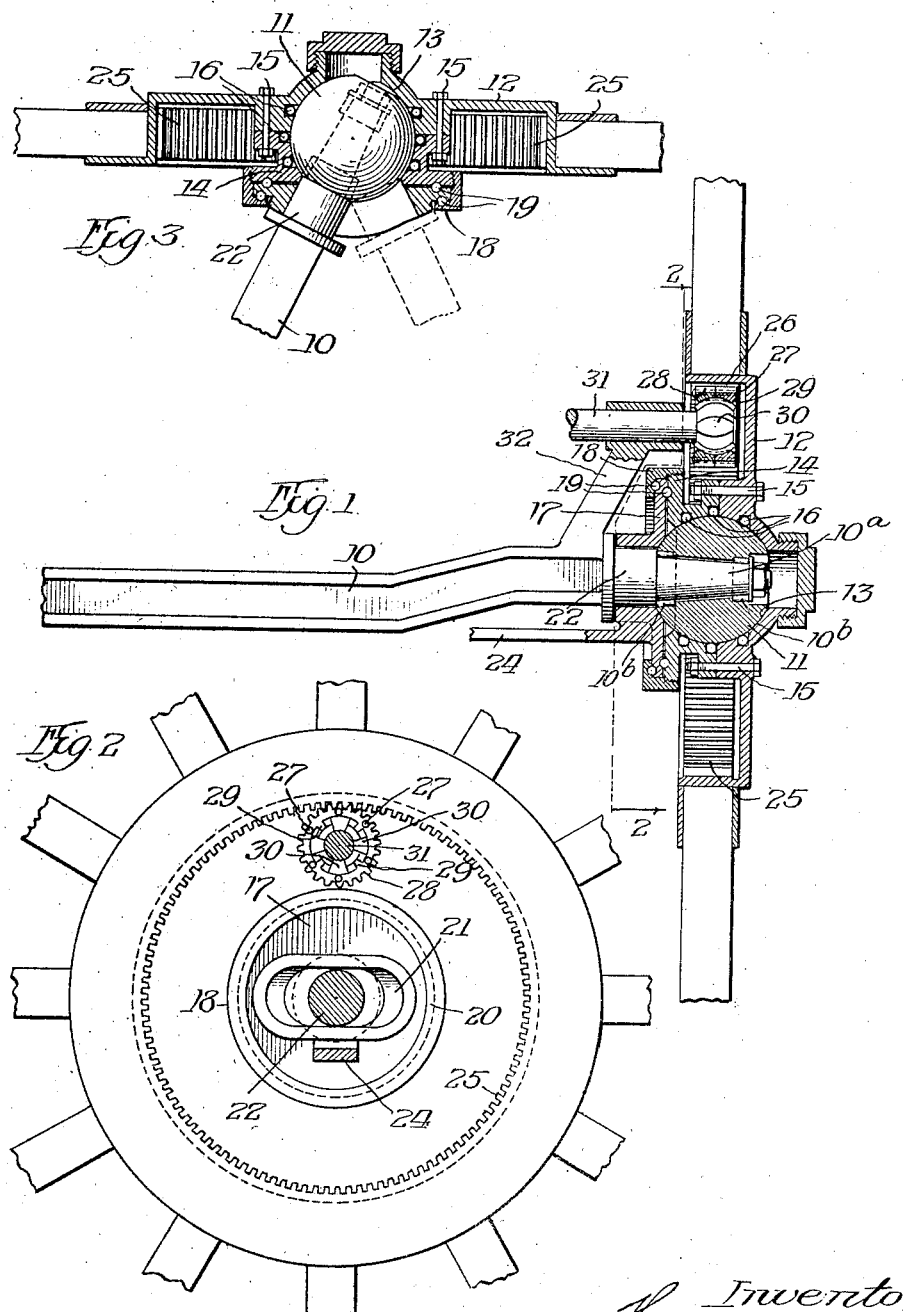

THOMAS SPACIE, OF DE KALB, ILLINOIS.

DRIVING AND STEERING WHEEL.

1,382,253.  Specification of Letters Patent.  Patented June 21, 1921.

Application filed July 3, 1919. Serial No. 308,552.

*To all whom it may concern:*

Be it known that I, THOMAS SPACIE, a citizen of the United States, and resident of De Kalb, in the county of De Kalb and State of Illinois, have invented certain new and useful Improvements in Driving and Steering Wheels, of which the following is a specification.

My invention relates to vehicles and particularly to a novel combined driving and steering wheel for use in connection therewith.

In my Patent Reissue No. 14,472, of May 14, 1918, I have disclosed a novel construction in which a wheel is mounted upon a spherical driving and supporting member, the wheel and spherical member having interengaging, generally ellipsoidal lugs, the object being to secure greater facility in driving and turning.

Because of the relatively great weight of trucks and tractors as now constructed, I have designed an improvement on the construction shown in my patent referred to heretofore, with the idea of better sustaining the loads and shocks incident to the rough usage of such vehicles. To that end I have provided a load-carrying or dead axle of the usual form and mount a spherical bearing member on each end thereof. The driving-steering wheels are mounted on the spherical members, suitable balls or rollers being interposed between the wheel and bearing member. I may also provide roller bearings between the axle end and the spherical member. By reason of the arrangement just described it will be seen that the wheel is capable of oscillation on the spherical member and rotation either on the spherical member or on the axle.

As a means for transmitting a driving force to the wheels I provide a driving or live axle having a generally spherical pinion rigid therewith, the pinion being mounted and held within a tooth pinion, the periphery of which is provided with gear teeth of the usual form adapted to engage with an internal gear carried by the wheel. The form of the engaging lugs carried by the spherical pinion and the member engaged thereby will conform substantially to the construction shown in my reissue patent heretofore referred to. It will be noted that the driving axle is mounted at a point directly in line with a vertical plane through the center of the dead axle and by forming the driving connection in the manner described, I am able to secure a highly efficient transfer of power to the driving-steering wheel without the necessity for a universal joint.

This arrangement insures a highly efficient construction, first, for the reason that the wheel is pivoted for oscillation on a center coincident with the vertical axis of the wheel. The supporting axle may be as heavy and rigid as desired while the driving axle, being arranged to carry no load, may be mounted in the most desirable manner. And, second, for the reason that I avoid the use of an outside universal joint in the driving axle. This insures greater driving efficiency and obviates the wear and difficulties encountered at this point where such joints are used.

The invention will be more readily understood by reference to the accompanying drawings, wherein, Figure 1 is a vertical sectional view through a driving, steering mechanism constructed in accordance with my invention;

Fig. 2 is a sectional view on the line 2—2 of Fig. 1, and,

Fig. 3 is a horizontal sectional view taken on the center line of the wheel.

In the drawings it will be seen that I provide a load-carrying or dead axle 10, having the usually tapered end 10ª. A spherical bearing member 11 is mounted on the axle end and is held in place in the usual manner. Roller or ball bearings 10ᵇ may be provided between the axle end and the spherical member if desired. A wheel center 12, has a hemispherical recess 13, therein adapted to coöperate with the sphere 11, the wheel being clamped in place by providing a second hemispherical member 14, bolted to the wheel center as at 15. Suitable ball bearings 16 will be provided for reducing friction. A steering plate 17, is held against the hemispherical member 14, by means of a flanged, threaded member 18, suitable ball bearings 19, being provided at the points of engagement between the parts. A horizontal arcuate slot 21, is provided which coöperates with the neck 22, of the axle, and serves to hold the wheel in vertical position while permitting it to oscillate, as shown in Fig. 3. A steering arm 24, is secured to the steering plate in the usual manner. By reason of the arrangement just described it will be seen that the steering plate is non-rotatable while the wheel is free to rotate and oscillate on the spherical end.

The wheel center 12, is provided with an internal gear 25, adapted to be engaged by a pinion 26, composed of two duplicate halves held together by cross bolts 27. The peripheral teeth 28 of this pinion engage with the teeth on the internal gear 25 in the usual manner. It will be noted, however, that the pinion 26, is provided with internal lugs 29, which are generally ellipsoidal in shape and engaged by similarly shaped lugs 30, carried by a spherical member which is rigid with the driving shaft 31. The driving shaft 31 may be carried in bearings provided in a bracket 32, and secured to or formed as a part of the load-carrying axle 10. The contour of the lugs on the driving and driven members 29, 30, will conform substantially to that fully disclosed in my reissue patent heretofore referred to with the purpose of permitting free oscillation of the driving pinion 26, as required by the oscillation of the wheel in steering without changing the efficiency of the power transmitting agent and without creating a force which tends to straighten out the wheel under the driving action. When constructed as described the wheel may be steered as readily when power is being transmitted therethrough as at other times. Furthermore, as the driving pinion is located in a direct line over the center of the supporting axle, the wheel may be oscillated on the center of the spherical bearing member. There is, therefore, no overhang with its resultant necessity for rigidly built steering elements to take up the shock incident to road service.

The exact form and arrangement of the parts are not essential and modifications may be made therein without departure from the spirit of my invention.

I claim:

In a device of the class described, the combination of a load-carrying axle having a spherical bearing, a wheel mounted for rotation and oscillation on said bearing, a gear carried by the wheel, a driving shaft having a spherical end, the shaft being mounted vertically above the axle, and a pinion engaging said gear and provided with a spherical axial recess adapted to accommodate the spherical end of the shaft, the end and said pinion having interengaging ellipsoidal lugs, substantially as described.

Signed at De Kalb, Illinois, this 28th day of June, 1919.

THOMAS SPACIE.

Witness:
C. O. LUNBERG.